(12) United States Patent
Kamimura

(10) Patent No.: US 7,746,269 B2
(45) Date of Patent: Jun. 29, 2010

(54) DME GROUND APPARATUS

(75) Inventor: Yukihiro Kamimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/129,335

(22) Filed: May 29, 2008

(65) Prior Publication Data

US 2008/0297399 A1     Dec. 4, 2008

(30) Foreign Application Priority Data

May 31, 2007     (JP)     ............................. 2007-145282

(51) Int. Cl.
G01S 13/08     (2006.01)
(52) U.S. Cl. .......................................... 342/47; 342/30
(58) Field of Classification Search ..................... 342/47
See application file for complete search history.

(56) References Cited

U.S. PATENT DOCUMENTS

| 3,716,857 | A | | 2/1973 | LeGrand | |
| 3,975,731 | A | * | 8/1976 | Latham et al. | 342/48 |
| 4,010,465 | A | | 3/1977 | Dodington et al. | |
| 5,859,878 | A | * | 1/1999 | Phillips et al. | 375/316 |
| 7,423,564 | B2 | * | 9/2008 | Kitayama et al. | 341/137 |
| 2002/0068536 | A1 | * | 6/2002 | Davis et al. | 455/161.1 |
| 2006/0262006 | A1 | * | 11/2006 | Vavik | 342/51 |

FOREIGN PATENT DOCUMENTS

| JP | 08-068843 A | 3/1996 |
| JP | 2629612 | 4/1997 |

* cited by examiner

*Primary Examiner*—Thomas H Tarcza
*Assistant Examiner*—Timothy A Brainard
(74) *Attorney, Agent, or Firm*—Oblon, Spivak, McClelland, Maier & Neustadt, L.L.P.

(57) ABSTRACT

The transponder unit provided in a DME ground apparatus detects the transmission rate at which to transmit the pulse-pairs constituting a response signal. The threshold of the reception level of the pulse detection unit provided in the transponder unit is raised as the transmission rate increases.

7 Claims, 2 Drawing Sheets

DME GROUND APPARATUS

CROSS-REFERENCE TO RELATED APPLICATIONS

This application is based upon and claims the benefit of priority from the prior Japanese Patent Application No. 2007-145282 filed on May 31, 2007, the entire contents of which are incorporated herein by reference.

BACKGROUND OF THE INVENTION

1. Field of the Invention

The present invention relates to distance measuring equipment (DME) that measures the distance between an aircraft and a ground apparatus. More particularly, the invention relates to a DME ground apparatus that is provided on the ground.

2. Description of the Related Art

The distance measuring equipment (herein after referred to as DME apparatus) is a secondary radar system composed of an airborne apparatus and a ground apparatus. The airborne apparatus is mounted in an aircraft. The ground apparatus is provided on the ground and communicates with the airborne apparatus.

The airborne apparatus (also known as DME airborne apparatus) has an interrogator. The ground apparatus (also known as DME ground apparatus) has a transmitting-receiving device called a transponder.

The interrogator incorporated in the airborne apparatus transmits interrogation pulses of UHF band (pair pulses) toward the transponder provided in the ground apparatus. (The interrogator and the transponder keep communicating, with a frequency difference of 63 MHz between them. This is because the frequency allocated to the interrogator is 1,025 to 1,150 MHz and the frequency allocated to the transponder is 962 to 1,213 MHz.) The distance between the aircraft and the ground apparatus is measured from the time that elapses until the interrogator receives response pulses (pair pulses) from the transponder after it has transmitted the interrogation pulses. (See, for example, Japanese Patent No. 2,629,612.)

The ground apparatus keeps transmitting random pulse signals at the rate of about 1,000 pps (Pulse pairs Per Second) even while no interrogation pulses are coming from the airborne apparatus. Only when the ground apparatus receives interrogation pulse signals from the airborne apparatus, it transmits response pulse signals in place of the random pulse signals. Therefore, pulse signals, including the random pulse signals and response pulse signals, are always transmitted from the ground apparatus at the rate of 1,000 to 2,700 pps, as long as the distance measuring equipment operates in normal state.

That is, the airborne apparatus sequentially transmits interrogation pulses to the ground apparatus, at random intervals (though the number of pulses per second is fixed, e.g., 30 pulses per second). The ground apparatus receives the interrogation pulse signal of a prescribed frequency from the airborne apparatus. The ground apparatus demodulates and decodes the interrogation pulse signal, and imparts a preset system delay time (e.g., 50 µs) to the interrogation pulse signal thus decoded. The ground apparatus then encodes the interrogation pulse signal, generating a response pulse signal. The response pulse signal is transmitted to the aircraft via a specific transmitting system.

In the aircraft, the airborne apparatus receives the response pulse signal and decodes the same. The airborne apparatus then measures the time that has elapsed from the transmission of the interrogation pulse signal to the reception of the response pulse signal. Since the speed with which the electric wave travels is fixed, the airborne apparatus calculates the distance between it and the ground apparatus from the time measured, using a prescribed calculation formula.

The ground apparatus can respond to the interrogations made in a plurality of airborne apparatuses (more precisely, the interrogators provided in the airborne apparatuses). The ground apparatus can therefore give about 100 aircrafts the data from which to calculate distances. Nonetheless, the ground apparatus neglects weak electric waves coming from far-off aircrafts if about 100 or more aircrafts make an access to it. Thus, the ground apparatus would not be over-loaded.

That is, in the ground apparatus, if the number of pulses transmitted increases too much, the amount of data the ground apparatus needs to stably receive the pulses increases. Consequently, in some cases, the ground apparatus may fail to respond, at a sufficiently high reliability, to any aircraft that is located near the ground apparatus and therefore needs to have distance data. To prevent this, an upper limit is set to the pulse transmission rate.

If the number of aircrafts using the ground apparatus increases, and the number of interrogation pulses from the airborne apparatus of the aircraft increases, the pulse transmission rate for the ground apparatus to respond to the interrogation pulse increases accordingly.

As the number of interrogation pulses increases, the pulse transmission rate may exceed the upper limit at the ground apparatus. In this case, the receiving sensitivity of the ground apparatus is lowered by using the automatic gain-control (AGC) function of the analog receiving system so as to reduce the number of interrogation pulses. The ground apparatus is thereby disabled from receiving the weak signals coming from the aircrafts located relatively far from the ground apparatus. The number of pulses received, which should be processed, is thereby reduced to achieve a control.

If a pulse receiving device incorporated in the ground apparatus is gain-controlled and therefore abruptly receives a high-level signal, an output circuit, detector and other circuits of the pulse receiving device may fail to preserve sufficient linearity. Even in this case, the blocking phenomenon is fast eliminated and the stable gain control can be achieved, as is reported in, for example, Japanese Patent No. 2,629,612. (Blocking phenomenon takes place when the pulse receiving device abruptly receives a high-level signal. Once it occurs, the gain control system cannot control the gain of the signal-amplifying system, saturating the waveform of the output signal of the receiving device, and the encoded pulses cannot be detected.)

As described above, the amount of data the DME ground apparatus needs to stably receive the pulses increases if the number of pulses transmitted from it increases. Consequently, the ground apparatus may fail to respond, at a sufficiently high reliability, to any aircraft that is located near the ground apparatus and therefore needs to have distance data. This is why an upper limit is set to the pulse transmission rate. As the number of interrogation pulses coming from the airborne apparatuses increases, the pulse transmission rate may exceed the upper limit at the ground apparatus. In this case, the receiving sensitivity of the ground apparatus is lowered to reduce the number of interrogation pulses by using the automatic gain-control (AGC) function of the analog receiving system. The ground apparatus is thereby disabled to receive the weak signals coming from the aircrafts flying relatively far from the ground apparatus. The number of pulses to process is thereby reduced, controlling the response reliability.

In the conventional DME ground apparatus, an analog circuit performs the process of reducing the number of pulses. Inevitably, it takes much time to finish this process, and the ground apparatus cannot be reduced in terms of circuit scale.

Japanese Patent No. 2,629,612 indeed describes the automatic gain control performed in a DME ground apparatus, but is silent about any process that should be performed if the number of pulses to transmit increases.

In view of the foregoing, the present invention has been made to provide a DME ground apparatus that can be well adjusted to work even if the number of pulses to transmit increases and that can be miniaturized.

BRIEF SUMMARY OF THE INVENTION

It is an object of the present invention to provide a DME ground apparatus that can be well adjusted to work even if the number of pulses to transmit increases and that can be miniaturized.

In an aspect of the present invention, a DME ground apparatus includes: an aerial unit that receives an interrogation signal from an aircraft; a transponder unit that receives the interrogation signal from the aerial unit, generates a response signal in response to the interrogation signal and transmits the response signal to the aircraft; and a monitor control unit that monitors and controls the transponder unit. The transponder unit controls a threshold of a reception level in accordance with a rate at which to transmit the pulse-pairs constituting the response signal, so as to process any interrogation signal of high reception level and not to process any interrogation signal of low reception level in order to prevent a pulse-pair transmission rate from exceeding an upper limit.

DETAILED DESCRIPTION OF THE INVENTION

A preferred embodiment of the present invention, or a DME ground apparatus, will be described with reference to the accompanying drawings.

Figure 1:
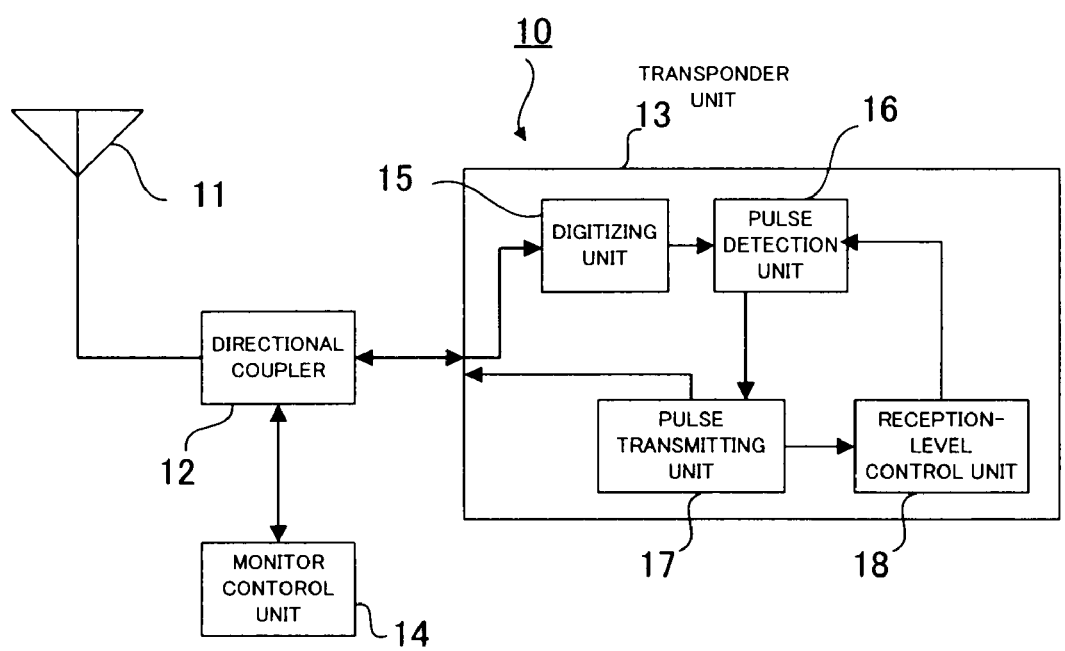
FIG. 1 is a block diagram showing a DME ground apparatus according to an embodiment of the present invention.

FIG. 1 is a block diagram showing a DME ground apparatus according to an embodiment of the present invention. The DME ground apparatus 10 includes an aerial unit (antenna unit) 11, a directional coupler (circulator) 12, a transponder unit 13, and a monitor control unit 14. The aerial unit 11 receives interrogation signals from aircrafts (not shown) and transmits response signals. The directional coupler 12 is connected to the aerial unit 11. The transponder unit 13 generates response signals in response to the interrogation signals coming from the aircrafts. The monitor control unit 14 monitors the other components of the DME ground apparatus 10.

The aerial unit 11 is an antenna that catches the interrogation pulse signals coming from the airborne apparatuses mounted in the aircrafts.

The directional coupler 12 is of the type generally used. That is, it is a general-purpose device used in the routing of the microwave transmission, to isolate, separate or combine signals.

The transponder unit 13 comprises a digitizing unit 15, a pulse detection unit 16, a response signal pulse transmitting unit 17, and a reception-level control unit 18. The digitizing unit 15 receives a signal, via the aerial unit 11 and directional coupler 12, from the interrogator of the airborne apparatus mounted in an aircraft, and digitizes the received signal. The pulse detection unit 16 detects pulses from the signal the digitizing unit 15 has digitized. The response signal pulse transmitting unit 17 transmits the pulses of a response signal in accordance with the output of the pulse detection unit 16. The reception-level control unit 18 controls the reception level of the pulse detection unit 16 in accordance with the rate at which the response signal pulse transmitting unit 17 transmits the pulse pairs of the response signal.

The digitizing unit 15 shapes the waveform of the input signal, generating digital pulses, by using a prescribed threshold based on the pulse peak of a pseudo Gaussian waveform. This is because the interrogation signal and the response signal have a pseudo Gaussian waveform in order to achieve an effective use of frequency and reduce an influence on adjacent frequency bands.

The pulse detection unit 16 incorporates circuits (not shown). Among these circuits are: a circuit that extracts pulses having widths falling within a tolerant range, from the digital pulses wave-shaped in the digitizing unit 15, by using a threshold; and a circuit that extracts pulses having widths larger than the threshold value, from the pulses wave-shaped in the digitizing unit 15. Thus, the pulse detection unit 16 detects pulses of specific widths as a signal.

The response signal pulse transmitting unit 17 imparts a preset system delay time (e.g., 50 μs) to the signal detected (decoded) in the pulse detection unit 16, thus encoding the signal, generating a response signal, in order to transmit the pulses of the response signal in accordance with the output of the pulse detection unit 16. The response signal pulse transmitting unit 17 transmits the response signal via the directional coupler 12 and aerial unit 11 to the aircraft that has transmitted the interrogation signal.

The response signal (i.e., transmitted pulses such as response pulses and random pulses) has of the following specification. That is, its frequency ranges from 962 MHz to 1,215 MHz, it has Gaussian-pulse waveform, it has a peak value of 3 KW or 1.5 KW, and it consists of a pair of pulses having a pulse width of 3.5 μs (spaced apart by, for example, 12 μs). Though the response signal is transmitted randomly, an upper limit of the pulse transmission rate is 2,700 pps.

The reception-level control unit 18 is constituted by a digital circuit. It controls the reception level of the pulse detection unit 16, in accordance with the change in the pulse-pair transmission rate at which the response signal is transmitted from the response signal pulse transmitting unit 17 and with the data representing the reception-level threshold corresponding to this change both of them being previously stored in a memory. That is, the reception-level control unit 18 adjusts, or increases the reception-level threshold, i.e., the receiving sensitivity of the pulse detection unit 16, in accordance with the pulse-pair transmission rate at which the response signal is transmitted from the response signal pulse transmitting unit 17. The threshold thus increased prevents the pulse-pair transmission rate from increasing over the preset upper limit.

Although it depends on the specification, the receiving sensitivity required of the DME ground apparatus 10 incorporated in the DME system is −91 dBm here. This receiving sensitivity is defined as the level the interrogation signal has when the number of pulses constituting the response signal is 70% of the number of pulses constituting the interrogation signal. Hence, even if its receiving sensitivity falls due to some cause, the DME ground apparatus 10 can cover a sufficient large aerial space unless the receiving sensitivity falls more than 6 dBm to below −85 dBm.

The monitor control unit 14 receives via the directional coupler 12 an interrogation pulse signal that has the same level as the signal coming from the DME airborne apparatus. Further, the monitor control unit 14 receives a response pulse signal from the response signal pulse transmitting unit 17 of the transponder unit 13 through the directional coupler 12. From the response pulse signal, the monitor control unit 14 keeps monitoring the operating state of the DME ground apparatus 10. The monitor control unit 14 may have a processing circuit, such as a digital counter, which counts the pulses of the response pulse signal. In this case, the monitor control unit 14 performs a control in accordance with the number of pulses counted.

How the DME ground apparatus 10 so configured as described above operates will be explained.

Assume that the aerial unit 11 receives an interrogation signal (of UHF band) from the interrogator of the airborne apparatus mounted in an aircraft. The interrogation signal is input via the directional coupler 12 to the digitizing unit 15 of the transponder unit 13. The digitizing unit 15 converts the interrogation signal (i.e., analog signal) to a digital interrogation signal.

The digital interrogation signal is input to the pulse detection unit 16. The pulse detection unit 16 detects the signal as a pulse pair, at a preset threshold value. The interrogation signal is thus decoded.

The interrogation signal thus decoded is input to the response signal pulse transmitting unit 17. The pulse transmitting unit 17 generates pulses based on the decoded interrogation signal, providing a response to the integration signal.

The response signal, thus generated in the response signal pulse transmitting unit 17, is supplied to the directional coupler 12 and thence to the aerial unit 11. The aerial unit 11 transmits the response signal to the aircraft that has transmitted the interrogation signal.

At the same time, the data representing the pulse-pair transmission rate at which the response signal generated in the response signal pulse transmitting unit 17 is transmitted is input to the reception-level control unit 18. The reception-level control unit 18 controls the reception level of the pulse detection unit 16, in accordance with the change in the pulse-pair transmission rate at which the response signal is transmitted from the response signal pulse transmitting unit 17 and with the data representing the reception-level threshold corresponding to this change both of them being previously stored in the memory. That is, the reception-level control unit 18 adjusts, if necessary, the reception level of the pulse detection unit 16 in accordance with the pulse-pair transmission rate of the response signal.

Figure 2:
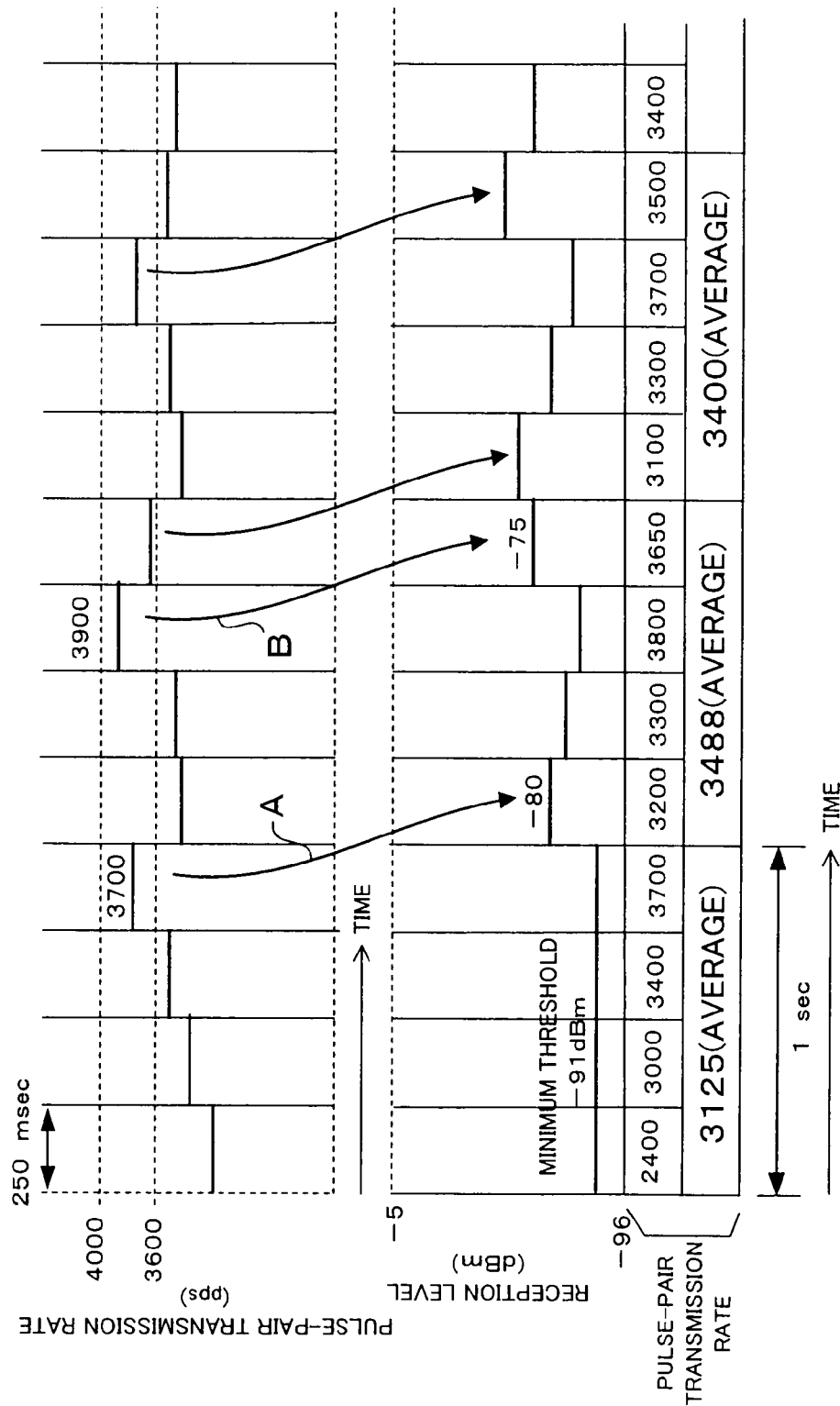
FIG. 2 is a timing chart explaining how the reception level is controlled in the DME ground apparatus according to the embodiment of the invention.

How the reception-level control unit 18 controls the reception level will be explained next. FIG. 2 is a timing chart explaining how the reception level is controlled. In FIG. 2, a graph of pulse-pair transmission rate is shown above a graph of reception level, because the reception level is controlled in correlation with the pulse-pair transmission rate. In both graphs, time is plotted on the axis of abscissa, and the pulse-pair transmission rate (pps) in the graph shown above and the reception level (dBm) in the graph shown below are plotted on the axis of ordinate. Note that the pulse-pair transmission rate (pps) may be 3,600 pps to 4,000 pps in a high-capacity specification that accords with, for example, the European standards (EUROCAE).

Assume that the pulse-pair transmission rate transmitted from the response signal pulse transmitting unit 17 changes from 2,400 pps to 3,000 pps, then to 3,400 pps, and thence to 3,700 pps, as illustrated in FIG. 2.

During these transmission rate changes, the reception level is maintained at the minimum threshold of −91 dBm.

At the time next to the time when the pulse-pair transmission rate changes to 3,700 pps, the reception level is raised to a higher level than −91 dBm, for example, of −80 dBm, as indicated by arrow A.

Similarly, at the time next to the time when the pulse-pair transmission rate changes to, for example, 3,900 pps, the reception level is raised to a still higher level, for example, of −75 dBm, as indicated by arrow B.

The threshold of the reception level is thus raised as the pulse-pair transmission rate increases, at which pulse pairs are transmitted from the pulse transmitting unit 17.

That is, the transponder unit 13 controls the threshold of the reception level of the pulse detection unit 16 in accordance with the pulse-pair transmission rate at which pulse pairs are transmitted from the pulse transmitting unit 17. More precisely, the transponder unit 13 raises the threshold of the reception level of the pulse detection unit 16 in accordance with the pulse-pair transmission rate at which to transmit the response signal to the aircraft from the unit 17. That is, the threshold is raised as this pulse-pair transmission rate increases. Therefore, only the interrogation signal received at high level is detected, where as any interrogation signal received at low level is not processed at all. This prevents the pulse-pair transmission rate from exceeding the upper limit.

If the number of pulses to transmit decreases, rendering it improbable that the pulse-pair transmission rate exceeds the upper limit, the threshold of the reception level is gradually lowered almost to the minimum value (−91 dBm), thereby controlling the reception level.

The control of raising the threshold of the reception level should better be performed as fast as possible so that the pulse-pair transmission rate may not exceed the upper limit. By contrast, the control of lowering the threshold of the reception level should better be performed as slow as possible so that the pulse-pair transmission rate may not exceed the upper limit.

If such control is performed in the DME ground apparatus, the level at which the DME ground apparatus receives an interrogation signal coming from an aircraft located at relatively long distance is lower than the level at which the DME ground apparatus receives an interrogation signal coming from an aircraft located at relatively short distance. Hence, the DME ground apparatus can transmit a response signal more reliably to the nearby aircraft than to the far-off aircraft. The airborne apparatus of the nearby aircraft can therefore measure the distance between it and the DME ground apparatus. This enables the pilot aboard the nearby aircraft to make an appropriate preparation for landing at the airport.

The present invention can provide a DME ground apparatus that can be well adjusted to work even if the number of pulses to transmit increases and that can be miniaturized.

It should be noted that the present invention is not limited to the embodiment described above. The components of the embodiment can be modified in various manners in reducing the invention to practice, without departing from the spirit or scope of the invention. Further, the components of the embodiment described above may be combined, if necessary, in appropriate ways, thereby to make different inventions. Still further, some of the component of the embodiment may be omitted. Moreover, the components of possible different embodiments of the invention may be combined in any desired fashion.

What is claimed is:

1. A distance measuring equipment (DME) ground apparatus comprising:

an aerial unit that receives an interrogation signal from an aircraft;

a transponder unit that receives the interrogation signal from the aerial unit, generates a response signal in response to the interrogation signal and transmits the response signal to the aircraft; and a monitor control unit that monitors and controls the transponder unit, wherein the transponder unit controls a threshold of a reception level in accordance with a rate at which to transmit pulse-pairs constituting the response signal, so as to process a response to an interrogation signal that has a reception level higher than a threshold value and not to process a response to an interrogation signal having a reception level lower than the threshold value, in order to prevent a pulse-pair transmission rate from exceeding an upper limit.

2. The DME ground apparatus according to claim 1, wherein the transponder unit has a digitizing unit that performs analog-to-digital conversion on the interrogation signal received by the aerial unit to generate a digital signal, a pulse detection unit that detects pulses from the digital signal generated by the digitizing unit, a response signal pulse transmitting unit that generates a response signal in response to the interrogation signal detected by the pulse detection unit and transmits the pulses of the response signal at a prescribed transmission rate, and a reception-level control unit that detects the transmission rate transmitted from the response signal pulse transmitting unit and controls the threshold of the reception level of the pulse detection unit in accordance with the transmission rate when the transmission rate increases.

3. The DME ground apparatus according to claim 2, wherein the digitizing unit generates digital pulses, each shaped by using a prescribed threshold based on a pulse peak of a pseudo Gaussian-pulse waveform of the interrogation signal input to the digitizing unit.

4. The DME ground apparatus according to claim 2, wherein the pulse detection unit has a circuit that extracts signals having a pulse width falling within a tolerant range, from digital pulses wave-shaped in the digitizing unit, by using a threshold, and a circuit that extracts pulses having a width larger than a given pulse width, from the wave-shaped digital pulses.

5. The DME ground apparatus according to claim 2, wherein the response signal pulse transmitting unit imparts a preset system-delay time to the signal detected in the pulse detection unit, thus encoding the signal, generating a response signal.

6. The DME ground apparatus according to claim 2, wherein the reception-level control unit is constituted by a digital circuit and controls the reception level of the pulse detection unit, in accordance with a change in the pulse-pair transmission rate at which the response signal is transmitted from the response signal pulse transmitting unit and with the data representing the reception-level threshold corresponding to this change, both the change and the data being previously stored in a memory.

7. The DME ground apparatus according to claim 2, wherein the monitor control unit receives through a directional coupler an interrogation pulse signal that has the same level as the signal coming from an airborne apparatus mounted in the aircraft, and receives a response pulse signal from the response signal pulse transmitting unit of the transponder unit through the directional coupler, thereby always monitoring the operating state of the DME ground apparatus.

* * * * *